(12) United States Patent
Lundberg et al.

(10) Patent No.: US 8,387,665 B2
(45) Date of Patent: Mar. 5, 2013

(54) COMBINATION SPRING AND GAS FILLED ACCUMULATOR

(75) Inventors: Philip C. Lundberg, Keego Harbor, MI (US); James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 227 days.

(21) Appl. No.: 12/635,587

(22) Filed: Dec. 10, 2009

(65) Prior Publication Data

US 2011/0139285 A1    Jun. 16, 2011

(51) Int. Cl.
*F16L 55/04* (2006.01)
(52) U.S. Cl. ....... 138/31; 138/30; 303/87; 303/DIG. 11; 60/592
(58) Field of Classification Search .................... 138/31, 138/30; 303/87, 119.4, DIG. 11; 60/566, 60/586, 584, 592
See application file for complete search history.

(56) References Cited

U.S. PATENT DOCUMENTS

| | | | | | |
|---|---|---|---|---|---|
| 3,669,151 | A | * | 6/1972 | Fleming | 138/31 |
| 4,765,366 | A | * | 8/1988 | Premiski et al. | 137/593 |
| 5,353,840 | A | * | 10/1994 | Paley et al. | 138/31 |
| 6,203,117 | B1 | * | 3/2001 | Starr et al. | 303/87 |
| 6,267,147 | B1 | * | 7/2001 | Rago | 138/31 |
| 6,390,133 | B1 | * | 5/2002 | Patterson et al. | 138/31 |
| 7,308,910 | B2 | * | 12/2007 | Weber | 138/31 |
| 7,971,608 | B2 | * | 7/2011 | Crimpita | 138/31 |
| 2006/0225800 | A1 | * | 10/2006 | Weber | 138/31 |

* cited by examiner

*Primary Examiner* — Patrick F Brinson

(57) ABSTRACT

A compact fluid accumulator both stores a relatively large amount of fluid and provides good fluid pressure stability. The accumulator includes a piston slidably disposed in a cylinder having a fluid inlet/outlet at one end which communicates with a first chamber and one face of the piston. Engaging the opposite face of the piston, and disposed in a second chamber, is a compression spring. The second chamber is filled with a gas which is at atmospheric pressure when the accumulator is relaxed. When pressurized hydraulic fluid fills the first chamber, the piston moves against the pressure of the spring and gas in the second chamber. The present invention thus provides an accumulator having the relatively small size of a gas filled accumulator without the leakage problem of a super-atmospheric gas charge—the extra force being provided by the compression spring.

8 Claims, 4 Drawing Sheets

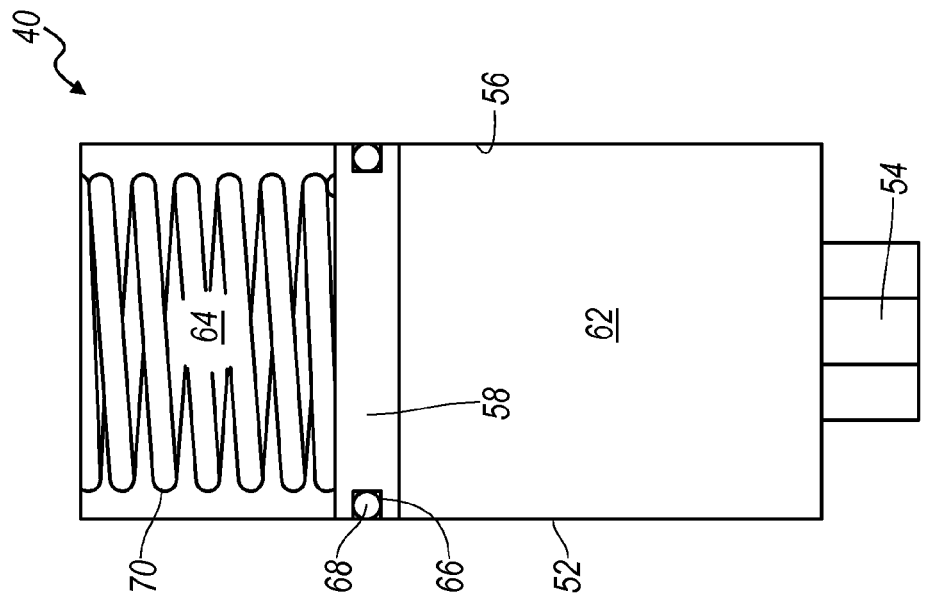
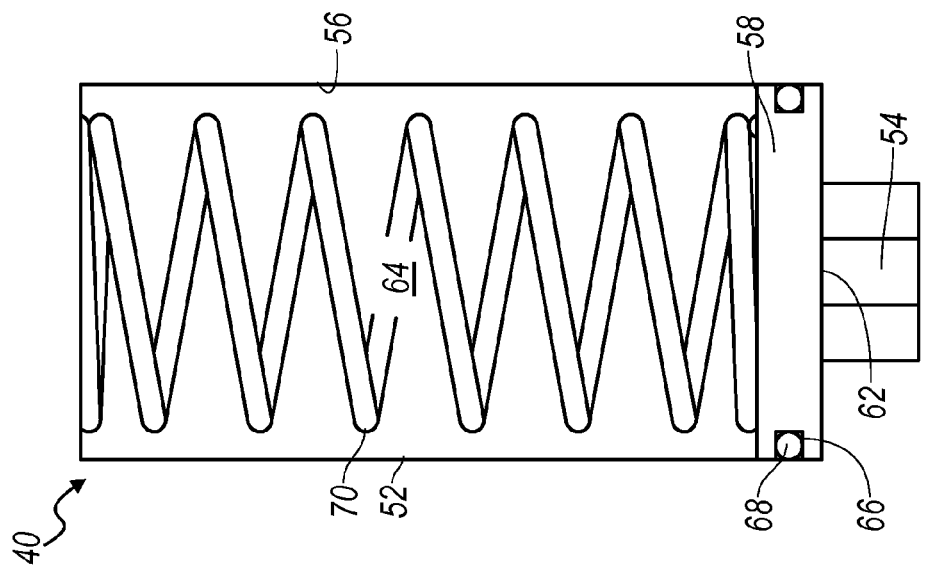
FIG. 2A
FIG. 2B

COMBINATION SPRING AND GAS FILLED ACCUMULATOR

FIELD

The present disclosure relates to accumulators for hydraulic fluid systems and more particularly to combination spring biased and gas filled accumulators for hydraulic fluid systems.

BACKGROUND

The statements in this section merely provide background information related to the present disclosure and may or may not constitute prior art.

Accumulators which are essentially pressurized fluid storage devices are common components of hydraulic fluid systems. They serve two related functions in such systems. On one hand, when a supply pump is operating, they function as a reservoir or storage site for excess pumped fluid resulting simply from pumped fluid volume exceeding system fluid consumption. On the other hand, when a supply pump is not operating or system fluid consumption exceeds pumped volume, the accumulator supplies pressurized fluid until the pump re-starts, supplies pressurized fluid while the pump restarts or until pump output exceeds fluid consumption. Thus, accumulators maintain and create both desired fluid pressure and flow in a hydraulic fluid system, improve the match between the instantaneous volume of fluid supplied by the pump and the instantaneous volume of fluid consumed by the system and thereby improve system operation.

Accumulators are a common component of many automatic transmission configurations in which selective flows of hydraulic fluid are utilized to manipulate spool valves and operate actuators, clutches and brakes to sequentially engage desired speed or gear ratios. The majority of automatic transmission accumulators take two forms: a super-atmospheric gas charged accumulator and a spring biased accumulator. In the first design, one face of a free piston in a cylinder is acted upon by the hydraulic fluid and the adjacent region defines a fluid storage volume; the opposite face of the piston and adjacent volume is charged with, for example, super-atmospheric pressurized nitrogen. The compressed (and compressible) gas provides a fluid spring against which the hydraulic fluid acts. The spring biased accumulator replaces the gas with a mechanical compression spring which biases the piston and maintains the pressure of the hydraulic fluid.

Notwithstanding their popularity, these devices each have shortcomings. For example, given the operating pressures of automatic transmissions, the most practical size gas filled accumulator will, as noted above, include a gas charged to a pressure above atmospheric pressure. Over the life of the accumulator, this pressurized gas will slowly leak out, rendering the accumulator without optimal functionality. This slow change will slowly but inexorably affect the operation of the transmission where there may not be enough fluid storage volume for operations such as re-engaging the clutches for engine start—stop vehicle launches. The alternative to a super-atmospheric pressure charged accumulator is an atmospheric pressure charged accumulator but this choice results in a much larger accumulator which is especially undesirable given the current trend toward highly efficient packaging. A spring accumulator is also generally larger than a gas filled accumulator and thus suffers from the same packaging related problems. Though size may appear to be a minor issue, it is a major issue and has major consequences in automotive component design. Thus, there is a need for an efficiently packaged accumulator for use in hydraulic systems such as those in automatic transmissions.

SUMMARY

The present invention provides a compact fluid accumulator which both stores a relatively large amount of fluid and provides good fluid pressure stability. The accumulator includes a piston slidably disposed in a cylindrical housing having a fluid inlet/outlet at one end which communicates with a first chamber and one face of the piston. Engaging the opposite face of the piston, and disposed in a second chamber, is a compression spring. The second chamber is filled with a gas which is at atmospheric pressure when the accumulator is relaxed. When pressurized hydraulic fluid begins to fill the first chamber, the piston moves against the pressure of the spring and gas in the second chamber. The accumulator of the present invention is especially suited for engine start—stop applications.

The present invention thus provides an accumulator having the small size of a gas filled accumulator without the leakage problem of a super-atmospheric gas charged chamber—the extra force being provided by the compression spring.

It is thus an object of the present invention to provide an accumulator for a hydraulic fluid system.

It is a further object of the present invention to provide an accumulator for a hydraulic fluid system of an automatic transmission.

It is a still further object of the present invention to provide an accumulator for a hydraulic control system of an automatic transmission.

It is a further object of the present invention to provide an accumulator having a piston disposed in a cylindrical housing.

It is a further object of the present invention to provide an accumulator having a cylindrical housing with an inlet/outlet at one end.

It is a further object of the present invention to provide an accumulator having a piston biased by both a compression spring and gas disposed in a cylindrical housing.

It is a further object of the present invention to provide an accumulator having a piston biased by both a compression spring and gas disposed in a cylindrical housing and adapted to engine start—stop applications.

It is a further object of the present invention to provide a compact accumulator having a piston biased by both a compression spring and gas.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2A is an enlarged, side view of a fluid accumulator according to the present invention in an unfilled state;

FIG. 2B is an enlarged, side view of a fluid accumulator according to the present invention in a filled state.

DETAILED DESCRIPTION

The following description is merely exemplary in nature and is not intended to limit the present disclosure, application, or uses.

Figure 1A:
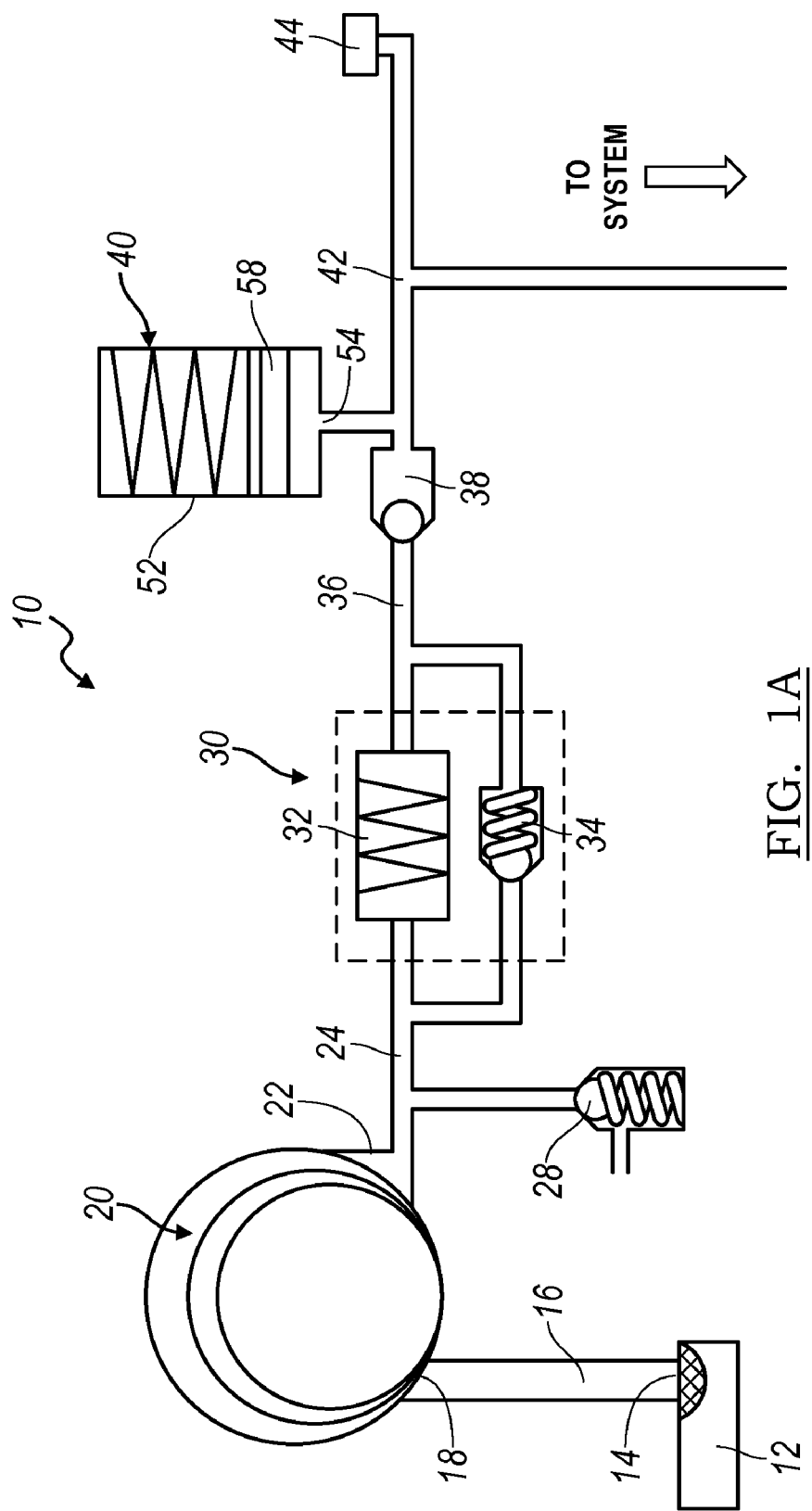
FIG. 1A is a diagrammatic view of a hydraulic fluid supply system incorporating a fluid accumulator according to the present invention.

With reference to FIG. 1A, a typical and representative hydraulic fluid supply system is illustrated and generally designated by the reference number 10. The hydraulic fluid supply system 10 may find application in, for example, vehicular automatic transmissions and numerous other devices having hydraulic control and hydraulic operating systems. The hydraulic fluid supply system 10 typically includes a sump 12 which is disposed at the lowest region of a housing (not illustrated) or other device or fluid containment component. Typically, a filter 14 is disposed in the sump 12 which filters the hydraulic fluid passing from the sump 12 to a suction line 16 to remove foreign particulate matter. The suction line 16 is in fluid communication with a suction or inlet port 18 of a hydraulic pump 20. Typically the pump 20 will be a positive displacement pump such as a vane pump (illustrated), a gear pump or a gerotor pump. The pump 20 also includes a pressure or outlet port 22 which communicates with a first pressure line 24. If desired, the supply system 10 may include a blow-off or pressure relief valve 28. The pressure relief valve 28 is pre-set at a pressure limit and when that pressure limit is exceeded in the pressure line 24, the pressure relief valve 28 opens, reducing the pressure in the first pressure line 24, and, typically, returning hydraulic fluid to the sump 12.

The first pressure line 24 is also in fluid communication with a filtration assembly 30. The filtration assembly 30 includes a second particulate filter 32, typically having finer filtration media and pores than the sump filter 14. Also contained in the filtration assembly 30 and in fluid parallel with the second filter 32 is a flow bypass valve 34. The flow bypass valve 34 is pre-set at a pressure differential and when this pressure differential is exceeded, due to flow restriction or plugging of the second filter 32, the flow bypass valve 34 opens to allow hydraulic fluid to flow around the second filter 32, thereby avoiding starving the supplied hydraulic system of hydraulic fluid.

A second pressure line 36 communicates with the outlet of the filtration assembly 30 and an inlet of a one-way or ball check valve 38. The ball check valve 38 allows hydraulic fluid flow from the filtration assembly 30 into the rest of the hydraulic system but prevents reverse flow from the system back into the filtration assembly 30 and other upstream components.

The outlet of the ball check valve 38 communicates with a fluid accumulator 40 and a main fluid supply line 42 which may optionally include a fluid pressure sensor or similar transducer 44 which provides a signal indicative of the pressure of the hydraulic fluid in the fluid supply line 42 to associated control equipment (not illustrated).

Figure 1B:
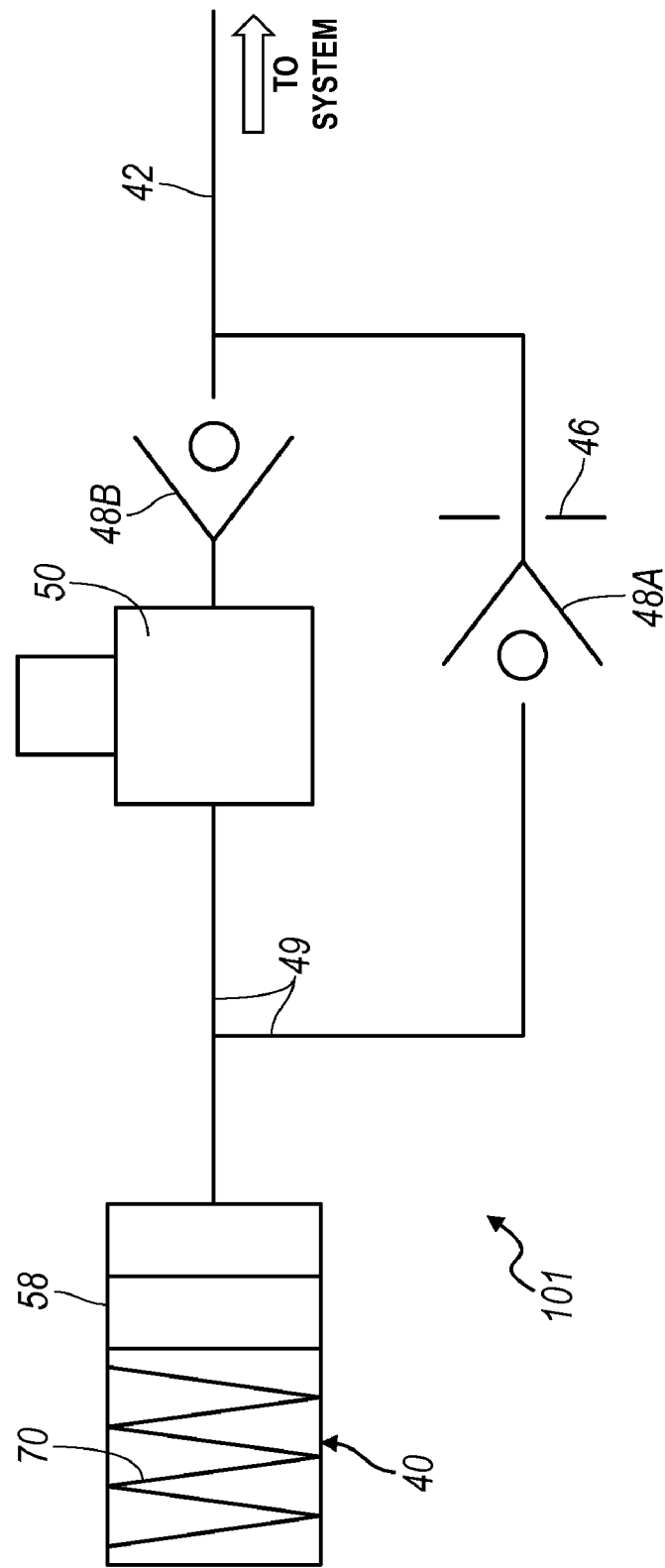
FIG. 1B is a fragmentary, diagrammatic view of a portion of a hydraulic fluid supply system incorporating a fluid accumulator according to the present invention which is especially suited to engine start—stop applications.

Referring now to FIG. 1B, a portion of a hydraulic fluid supply system 10' incorporating a fluid accumulator 40 according to the present invention, which is specific to engine start—stop applications, is illustrated. The components illustrated in FIG. 1B are associated with and in communication with the main fluid supply line 42 and reside generally on the right side of FIG. 1A. In communication with the main fluid supply line 42 is a flow restricting orifice 46 which, in turn, communicates with another one-way or ball check valve 48A which is configured to permit fluid flow toward a hydraulic line 49 and the accumulator 40 but prevent reverse flow. The accumulator 40 in this application is the same as the accumulator 40 in FIG. 1A, includes a piston 58 and a spring 70 and is further described below. Also in fluid communication with the accumulator 40 and the hydraulic line 49 is a solenoid valve 50. The solenoid valve may be electrically energized to open and provide fluid communication and flow therethrough out of the accumulator 40 to an additional one-way or ball check valve 48B. The additional check valve 48B is configured to permit fluid flow toward the main supply line 42 but prevent reverse flow.

Referring now to FIGS. 1A, 1B, 2A and 2B, the fluid accumulator 40 includes a generally cylindrical housing 52 having an inlet/outlet port 54 which communicates with the fluid supply line 42 in FIG. 1A and the hydraulic line 49 in FIG. 1B. The housing 52 defines a cylinder 56 having the piston 58 which divides the cylinder 56 into a first, fluid chamber 62 and a second, gas chamber 64 on the opposite side or face of the piston 58. The piston 58 defines a circumferential channel or groove 66 which receives an O-ring seal 68 which provides a fluid tight seal between the piston 58, the wall of the cylinder 56 and between the chambers 62 and 64. An additional groove 66 and O-ring seal 68 may be utilized in the piston 58, as well as other seal types, if desired. Additional glide rings may be incorporated if deemed necessary. Typical oil storage volumes of the accumulator 40 in automatic transmission hydraulic systems will be less than about 0.3 liters.

Disposed within the second, gas chamber 64 is the compression spring 70. The compression spring 70 may take many forms and have a spring constant (rate) that varies significantly depending upon the particular application and system pressure. In applications such as vehicular automatic transmissions, spring constants (rates) in the range of about 20 newtons/meter to about 28 newtons/meter have been found suitable and a nominal value of 24 newtons/meter has been found preferable. Additionally, the compression spring 70 is preloaded for automatic transmission service to between about 600 and 650 newtons and a nominal value of 622 newtons has been found preferable. Other spring rates and preloads of the compression spring 70 are within the purview of the present invention and can vary significantly from the values recited above based upon the application, system operating pressure and other design criteria. Preferably, as well, the compression spring 70 is a coil spring, as illustrated, although helical (spiral) springs or stacked spring washers or Belleville springs, for example, and other spring configurations may be utilized.

In FIG. 2A, the accumulator 40 is presented in a relaxed state with essentially no hydraulic fluid in the first, fluid chamber 62. In this case, the second, gas chamber 64 is filled with a gas, essentially at atmospheric pressure having a volume $V_1$. Depending upon design and application parameters, there may or may not be a preload on the compression spring 70. In FIG. 2B, the accumulator 40 is presented with a full fluid charge and the piston 58 has translated a full stroke to its travel limit. Now the first, fluid chamber 62 is at its maximum volume and is fully filled with pressurized hydraulic fluid. The second, gas chamber 64 is at its minimum volume $V_2$, determined by the stack of the compression spring 70. The general equation for the instantaneous pressure of the accumulator 40 which essentially represents a force balance on the piston 58 is $$P_2 = P_1\left(\frac{V_1}{V_2}\right)^{(k-1)}\left(\frac{V_1}{V_2}\right) + \frac{K(D)+B}{\pi(R)^2}$$

where $P_1$ is the initial pressure in the second, gas chamber 64, $P_2$ is the final pressure of the hydraulic fluid in the first, fluid chamber 62, $V_1$ is the initial volume of the second, gas chamber 64, $V_2$ is the final volume of the second, gas chamber 64, K is the spring constant of the compression spring 70, D is the displacement of the piston 58 from its relaxed position illustrated in FIG. 2A and its energized position illustrated in FIG. 2B, B is the preload of the compression spring 70 and R is the radius of the piston 58.

Figure 3:
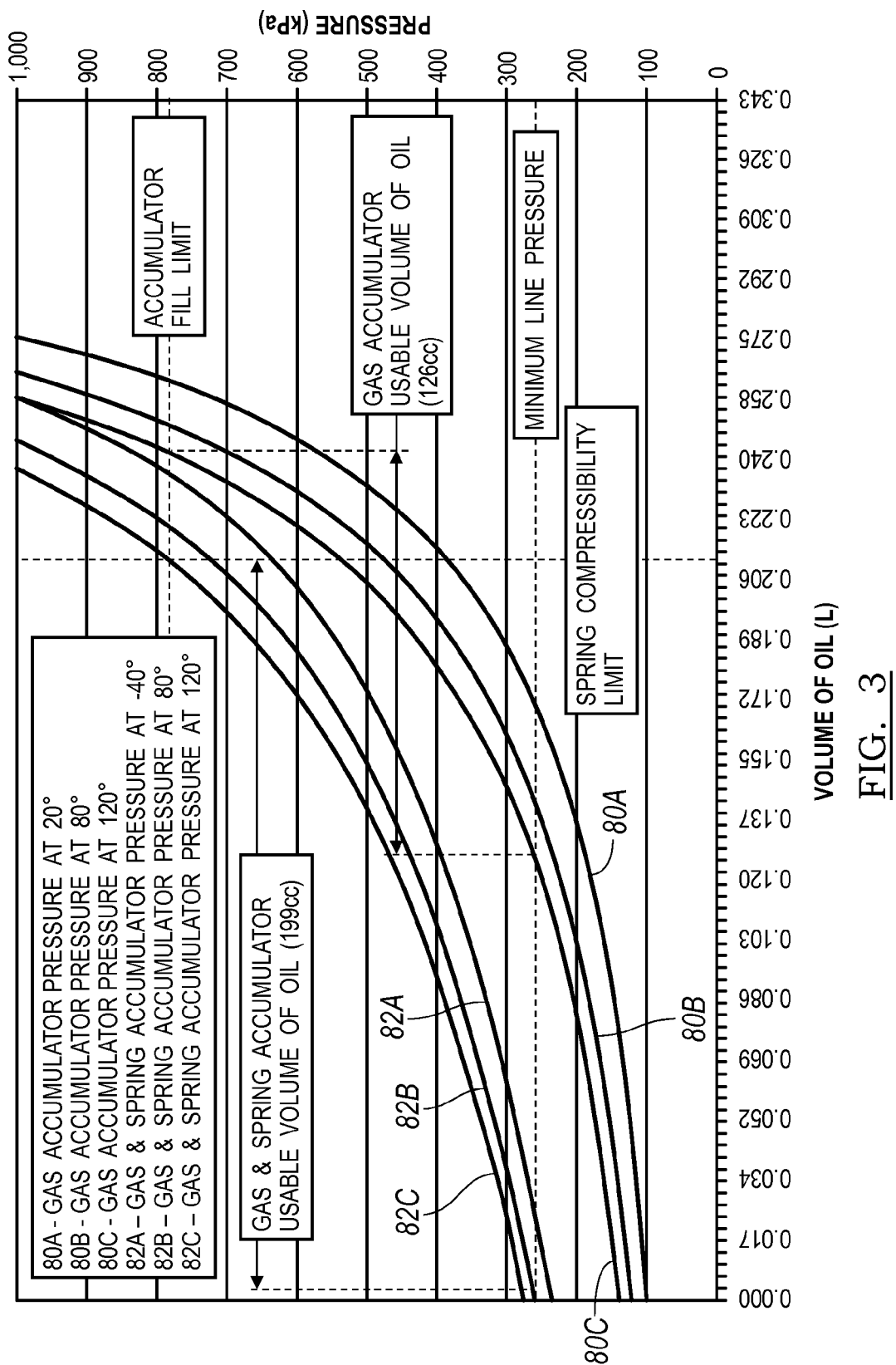
FIG. 3 is a multiple plot graph presenting the performance of a prior art gas filled accumulator at three different temperatures and the performance of an accumulator according to the present invention at the same three temperatures.

Referring now to FIG. 3, a multiple plot graph illustrates the performance of a prior art gas charged accumulator and an accumulator 40 according to the present invention having both a compression spring and gas charge. Both accumulators define the same interior volume. The graph plots hydraulic fluid volume along the horizontal (X) axis and hydraulic fluid pressure along the vertical (Y) axis. The three lower plots 80A, 80B and 80C present data from a prior art accumulator having only a gas charge at 20° C., 80° C. and 120° C., respectively. The three upper plots 82A, 82B and 82C present data from a combination spring and gas filled accumulator 40 according to the present invention also at 20° C., 80° C. and 120° C., respectively. Note that a gas charged accumulator has a usable volume of only 126 cc whereas the accumulator 40 according to the present invention has a usable volume of 199 cc. As a general observation, the accumulator 40 according to the present invention, with the same stored hydraulic fluid volume, operates and provides a higher pressure at essentially all operating conditions when compared to the accumulator having only a gas charge.

The foregoing description of the invention is merely exemplary in nature and variations that do not depart from the gist of the invention are intended to be within the scope of the invention and the following claims. Such variations are not to be regarded as a departure from the spirit and scope of the invention.

What is claimed is:

1. A hydraulic fluid supply system comprising, in combination,
    a sump,
    a suction line disposed in said sump,
    a pump having a inlet in fluid communication with said suction line and an outlet in fluid communication with an outlet line,
    a pressure relief valve in fluid communication with said outlet line,
    an accumulator,
    a check valve only permitting fluid flow from said outlet line to said accumulator,
    another check valve only permitting fluid flow from said accumulator to said outlet line and
    a solenoid valve in series with said another check valve,
    said accumulator including a housing defining a cylinder and having an inlet/outlet port at one end,
    a piston disposed in said cylinder having a circumferential channel and an O-ring seal disposed in said channel and defining a first, fluid chamber in fluid communication with said inlet/outlet port and a second, gas chamber, and
    a compression spring and a gas disposed in said second, gas chamber for biasing said piston toward said first, fluid chamber.

2. The hydraulic fluid supply system of claim 1 further including a pressure transducer in fluid communication with said outlet line.

3. The hydraulic fluid supply system of claim 1 wherein said compression spring is a coil spring.

4. The hydraulic fluid supply system of claim 1 wherein said gas in said second chamber is at substantially atmospheric pressure when the first chamber is exhausted.

5. The hydraulic fluid supply system of claim 1 wherein said compression spring has a spring constant of between about 20 newtons/meter and 28 newtons/meter.

6. A spring biased and gas filled accumulator assembly for hydraulic systems comprising, in combination,
    a cylindrical housing defining a cylinder and having an inlet/outlet port at one end,
    a piston slidably disposed in said cylinder, having two opposed faces, a circumferential channel and an O-ring seal disposed in said channel for sealing between said piston and said cylinder and defining a first, fluid chamber adjacent one face of said piston in fluid communication with said inlet/outlet port and a second, gas chamber adjacent another of said faces,
    a compression spring and a gas disposed in said second, gas chamber for biasing said piston toward said first, fluid chamber,
    a first fluid circuit communicating with said inlet/outlet port and disposed in parallel with a second fluid circuit, said first fluid circuit including a first check valve and an orifice and said second fluid circuit including a solenoid valve and a second check valve.

7. The accumulator assembly or claim 6 wherein said first check valve inhibits fluid flow away from said inlet/outlet port of said accumulator and permits fluid flow toward said inlet/outlet port of said accumulator.

8. The accumulator assembly or claim 6 wherein said second check valve inhibits fluid flow toward said inlet/outlet port of said accumulator and permits fluid flow away from said inlet/outlet port of said accumulator.

* * * * *